US006285346B1

United States Patent
Melnik et al.

(10) Patent No.: US 6,285,346 B1
(45) Date of Patent: Sep. 4, 2001

(54) INCREASED-FREQUENCY ADDRESSING OF DISPLAY SYSTEM EMPLOYING REFLECTIVE LIGHT MODULATOR

(75) Inventors: George Melnik, Montrose; Peter Janssen, Scarborough, both of NY (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/216,257

(22) Filed: Dec. 18, 1998

(51) Int. Cl.[7] .................................................. G09G 3/36
(52) U.S. Cl. ................ 345/87; 345/96; 348/742
(58) Field of Search .................. 345/87, 96, 209; 348/742, 743

(56) References Cited

U.S. PATENT DOCUMENTS 5,337,068 * 8/1994 Stewart et al. ...................... 345/88
5,448,314 * 9/1995 Heimbuch et al. .................. 348/743
5,969,700 * 10/1999 Fitgibbons et al. .................. 345/87
6,002,452 * 12/1999 Morgan ................................ 348/742

FOREIGN PATENT DOCUMENTS

0875881A2   11/1998   (EP) ................... G09G/3/36

* cited by examiner

Primary Examiner—Richard Hjerpe
Assistant Examiner—Alexander Eisen

(57) ABSTRACT

In a scrolling color projection system for displaying images represented by continuously updated frames of information, eg., video images, and employing a single, reflective electro-optic light modulator such as an AMLCD, flicker in the image caused by asymmetric electrical behavior of the light modulator is reduced without substantially reducing the brightness of the display, by addressing the modulator array at least twice during each frame period.

12 Claims, 3 Drawing Sheets

INCREASED-FREQUENCY ADDRESSING OF DISPLAY SYSTEM EMPLOYING REFLECTIVE LIGHT MODULATOR

BACKGROUND OF THE INVENTION

This invention relates to display systems for displaying continuously updated image information signals arranged in successive frames, employing electro-optic light modulators, and more particularly relates to a scrolling color projection display system in which color bars are repetitively scrolled across a single electro-optic light modulator panel to produce a color display.

Such single panel scrolling color display systems are known. See, for example, commonly assigned U.S. Pat. No. 5,532,763, incorporated herein by reference.

These display systems are particularly suitable for displaying color information in the form of continuously updated image information signals arranged in successive frames representing full color frames, each frame comprised of component color subframes, such as color video information. These systems employ an electro-optic light modulator comprised of a row-and-column matrix array of pixels, for modulating light in accordance with the image information signals during successive frame periods. The signal information is applied to the pixel rows of the array a line at a time during each frame period for each component color.

Such display systems employing a single reflective high-density active-matrix liquid crystal display (AMLCD) on silicon as the electro-optic light modulator are being considered for high resolution color projection systems, due to the fact that the matrix structure of row and column electrodes, switches and storage capacitors can all be integrated on the silicon substrate below the reflective pixel electrodes, thus enabling the high pixel density required for such high resolution displays.

Unfortunately, the location of the reflective pixel electrodes in the LC cell structure leads to an asymmetric electrical behavior during driving, in the form of a DC off-set in the drive voltage, even in the case of AC driving. This DC off-set is perceived as flicker by the viewer of a continuously updated display image, such as a video image One way to suppress this flicker (George: is this publicly known?) is to adjust the drive voltage to compensate for the DC off-set. However, such a compensation scheme is difficult to implement, since the off-set voltage tends to be non-uniform over the pixel array, and also tends to vary with time.

Another way to suppress this flicker would be to operate the system at a frame rate well above the limit where flicker can be perceived. However, such an operation would reduce the brightness of the display. The reason for this is that guard bars (30, 34 and 38 in FIGS. 2 and 3A) separate the color bars (32, 36 and 40), in order to accommodate the finite switching time of the LC material, and thus preserve color purity.

Operating the system at a higher frame rate) would reduce the size of the color bars (46, 50, 54, 58, 62, 66 in FIG. 3B) in the scrolling direction, since the time period for addressing the pixel array with each new frame of color information would be reduced. However, the size of the guard bars (44, 48, 52, 56, 60, 64) would remain the same, because the switching time of the LC material remains the same. Thus, the proportion of dead time in which the pixel array is not being addressed with color information would be reduced.

OBJECTS AND SUMMARY OF THE INVENTION

Accordingly, it is an object of the invention to provide a display system for displaying continuously updated image information signals arranged in successive frames, and employing a reflective electro-optic light modulator, in which flicker of the display is reduced without substantially reducing the brightness of the display.

It is another object of the invention to provide such a projection system employing scrolling color bars, in which flicker of the display is reduced without substantially reducing the brightness of the display.

It is yet another object of the invention to provide such a scrolling color bar projection system employing a reflective AMLCD light modulator, in which flicker due to electrical asymmetry in the AMLCD is reduced without substantially reducing the brightness of the display.

It is a still further object of the invention to provide a method for addressing a display system employing a reflective electro-optic light modulator in which flicker of the display is reduced without reducing the brightness of the display.

In accordance with the invention, a display system is provided for displaying continuously updated image information signals arranged in successive frames representing color frames, the system employing a reflective electro-optic light modulator comprised of a row-and-column matrix array of pixels, for modulating light in accordance with the image information signals during successive frame periods, wherein each row of the array is addressed at least twice during each frame period with the image information.

In accordance with a preferred embodiment of the invention, the matrix array is illuminated with scrolling color bars corresponding to the color signal information being addressed.

In accordance with another embodiment of the invention, each frame comprises two or more component color sub-frames, and each row of the array is addressed at least twice during each frame period with the image information signals for at least one of the component color sub-frames, and preferably for all of the component color sub-frames.

Preferably, the reflective electro-optic light modulator is an active matrix liquid crystal display (AMLCD) device.

DESCRIPTION OF THE PREFERRED EMBODIMENTS

Figure 1:
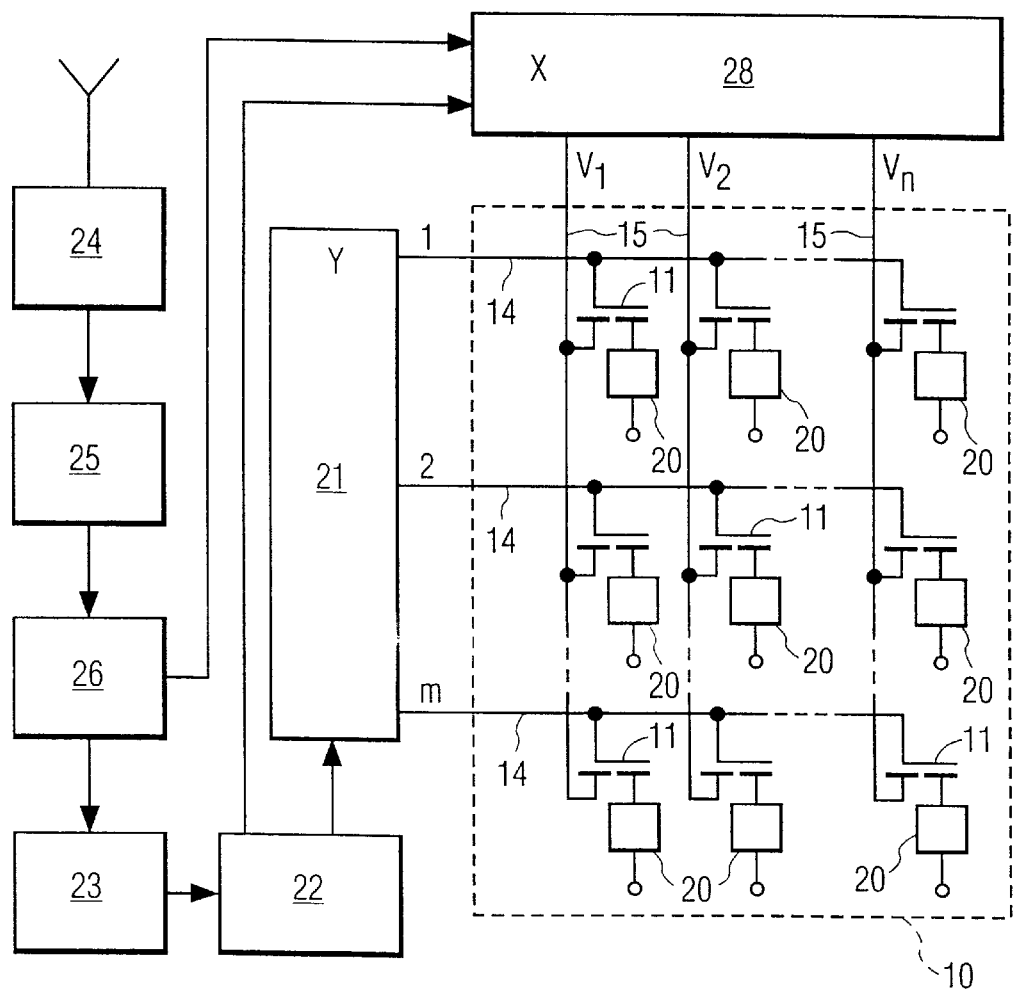
FIG. 1 is a simplified plan view of a typical AMLCD device of the prior art.

Referring to FIG. 1, There is shown schematically a block diagram of a LCD-TV display system of the prior art including a display device which comprises an AMLCD panel 10. The panel 10 consists of m lines (1 to m) with n horizontal display (picture) elements or pixels 20 (1 to n) in each line. In practice, the total number of display elements (m×n) in the matrix array may be 100,000 or more (up to 1.3 million for HDTV). Each display element 20 (representing one pixel of the display) has an associated IGFET transistor acting as a switching element. The gates of all the IGFETs in each line are connected to a row (Y) electrode 14 and the source electrodes of each IGFET in a column are connected to a column (X) electrode 15, there being m row electrodes 14 and m column electrodes 15. The drains of the IGFETs 11 are connected to respective electrodes of the display elements in a manner which will be described.

A common counterelectrode for the display elements is carried by a substrate spaced from the substrate carrying the IGFETs and the associated electrodes of the display elements with liquid crystal material disposed therebetween. The liquid crystal material modulates light according to voltage applied there across. Color filters in registration with the picture elements may be employed to produce a color display using known principles.

Addressing of each line of the matrix array of display elements 20 is achieved by applying a gate voltage to the row electrode 14 for that line for an addressing time Ta. This turns on all IGFETs in that row of the matrix, allowing video information to be transferred to the display elements via the column electrodes 15. The row electrodes are sequentially addressed in this manner to provide line-at-a-time scanning of the entire matrix array. One completed scan of the matrix array represents one frame of video information, after which the array is readdressed with the next frame of information.

During the time Ta in which the IGFETs in one line are turned on to allow addressing, all of the other IGFETs in the remaining rows of the array are switched off, thus isolating their associated picture elements from stray voltages which would otherwise introduce display-degrading cross-talk. During this time interval, these isolated picture elements must maintain their picture information by virtue of their natural capacitance and any auxiliary storage capacitance (not shown in this figure).

As can be seen in FIG. 1, the row (Y) electrodes 14 are driven by a digital shift register 21 supplied with regular timing pulses from a clock circuit 22 which is fed with line synchronizing pulses from a synchronization seperator 23 derived from the incoming signals via a tuner 24, IF circuits 25 and video amplifier 26.

Video information signals are supplied to the column (X) electrodes 15 simultaneously from an analog shift register circuit 28, comprising one or more shift registers, supplied with video signals from the video amplifier 26 and timing pulses from the clock circuit 22 in sync with line addressing. The shift register circuit provides serial-to-parallel conversion appropriate to the line-at-a-time addressing of the panel 10, samples the corresponding line in the video signal and places the appropriate voltages on the column (X) electrodes 15, thence to the source side of the IGFETs in the column. When the IGFETs in the line being addressed are turned on, the voltage at each source is transferred to the drain, and thence to the picture element connected to the drain, whereby the liquid crystal associated with the element is charged with the source voltage representing the video information for that element.

Figure 2:
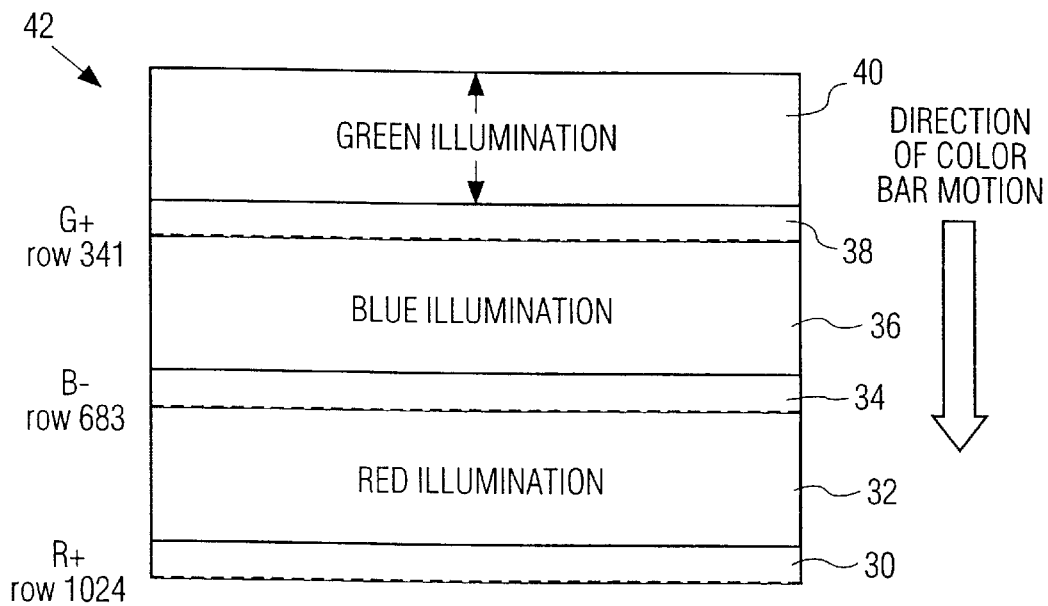
FIG. 2 is a schematic representation of the illumination of an electro-optic light modulator panel in a scrolling color system.

Referring now to FIG. 2, there is shown a schematic representation of the illumination of an electro-optic light modulator panel in a scrolling color system. Such a panel is typically an AMLCD composed of a matrix of rows (or lines) and columns of pixels defined by individually addressable reflective pixel electrodes (not shown), addressed in a line-at-a-time manner as described above. Red, blue and green color bars (32, 36, 40) continuously scroll down the matrix array (represented by box 42) in the direction of the arrow. Red color bar 32, blue color bar 34 and green color bar 36 are shown on the array at instant of time t.

Addressing of the rows with the color signal information corresponding to that of the next advancing color bar leads the color bar by a distance corresponding to the switching time needed for the LC material to switch to the state corresponding to the new color signal, this distance referred to herein as the guard bar. Thus, at the instant of time t, row 341 is being loaded with green signal information, row 683 is being loaded with blue signal information, and row 1024 is being loaded with red signal information. The spaces between the color bars 32, 36 and 40 represent guard bars 30, 34 and 38.

Figure 3A:
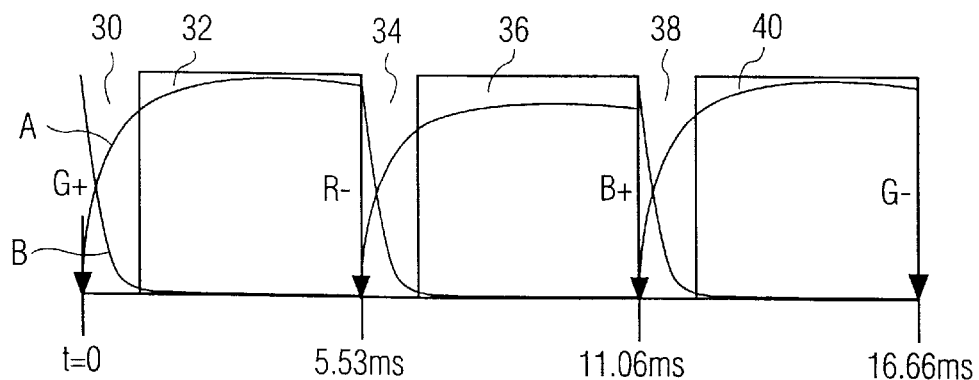
FIGS. 3A an 3B are timing diagrams with different frame rates for addressing a row of a pixel matrix of an electro-optic light modulator of a scrolling color projection system.

Referring to the timing diagram of FIG. 3A, which represents the timing of events for any particular line in the AMLCD at a frame rate of 60 Hz, it is seen that a frame period of 16.66 mS is divided into three equal sub-frame periods for the addressing of the red, blue and green primary color components of one frame of full color video information. The arrows at t=0; t=5.53 mS; and t=11.06 mS mark the beginning of addressing of the green (G+), red (R+) and blue (B+) component color signal information. The curves A, rising at the beginning of addressing, represent the optical response of the LC material to the signal information, showing a delay in achieving the transmission state representative of the signal information. Thus, the curves A represent the brightness increase of the display with time. The curves B, falling at the beginning of addressing, represent the optical relaxation of the LC material after addressing by the previous color component's signal information (?). The shaded blocks 32, 36 and 40 represent the illumination of the matrix array with the respective green, red and blue color bars. The spaces 30, 34 and 38 between the shaded blocks represent the guard bars.

Figure 3B:
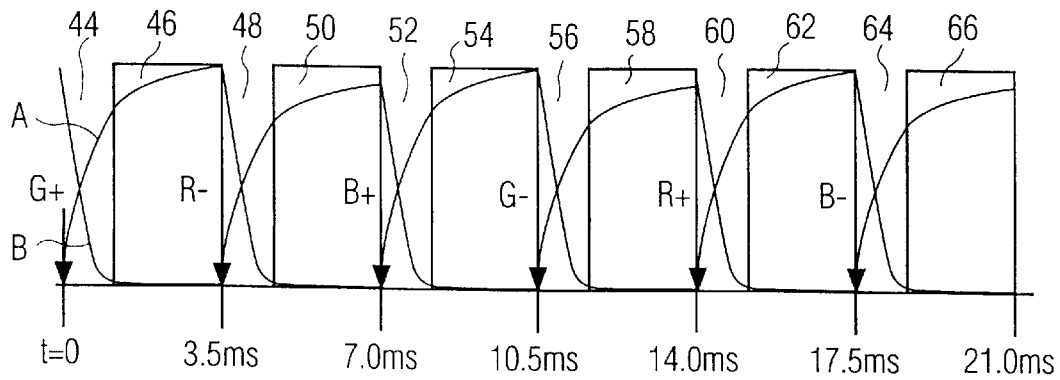

FIG. 3B, a timing diagram similar to that of FIG. 3A, illustrates graphically the effect: on system performance of increasing the frame rate from 60 Hz to 95 Hz. The frame rates 60 Hz and 95 Hz are selected for comparison because, when the guard bar is kept constant at 600 uS, the illumination time of one color bar on the matrix array at 60 Hz is equivalent to the illumination time of two color bars at 95 Hz. There are now twice as many color bars (46, 50, 54, 58, 62, 66) and guard bars (44, 48, 52, 56, 60, 64) as in FIG. 3A.

A loss of nearly 10% of light throughput is realized due to the additional guard bars required at 95 Hz. A further loss of about 34% of light throughput is realized due to the response time of the LC material, for a 0–90% optical relaxation time of 1.2 mS. This loss was determined by integrating the area under each brightness response curve A of the LC material during their respective illumination cycles.

Figure 4:
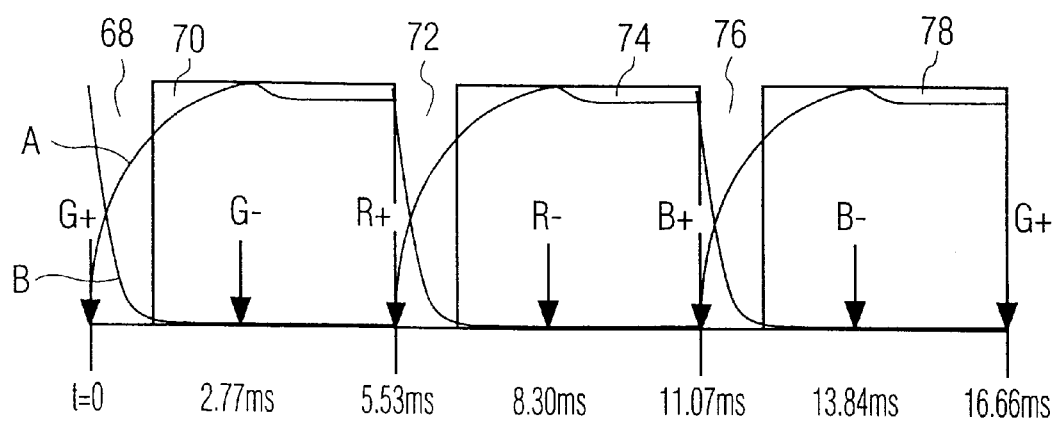
FIG. 4 is a timing diagram for a scrolling color projection system of the invention, in which the frequency of addressing is increased without increasing the frame rate.

FIG. 4 shows a timing diagram similar to those of FIGS. 3A and 3B, in which the frequency of addressing each color component, ie., the refresh rate, is doubled, while maintaining the same overall frame rate, in order to reduce flicker without decreasing light throughput of the system. Thus, the green component color signals are addressed beginning at the arrow marked G+, and again beginning at the arrow marked G– (– indicates inverted polarity of the G signals), and so on for R and B. Thus, each row is addressed twice per color sub-frame, with the polarity being inverted each time. As in FIGS. 3A and 3B, the shaded blocks 70, 74 and 78 represent the green, red and blue color bars, respectively, while spaces 68, 72 and 76 represent the guard bars.

What we claim as our invention is:

1. A display system for displaying continuously updated image information signals arranged in successive frames representing full color frames, the system employing a reflective electro-optic light modulator comprised of a row-and-column matrix array of pixels, for modulating light in accordance with the image information signals during successive frame periods, and means for addressing the array with the image information signals, wherein each row of the array is addressed at least twice during each frame period.

2. The display system of claim 1 in which each frame comprises at least two component color sub-frames, and each row of the array is addressed at least twice during each frame period with the image information signals for at least one of the component color sub-frames.

3. The display system of claim 1 in which each row of the array is addressed at least twice during each frame period with the image information for all of the component color sub-frames.

4. The display system of claim 1 in which the reflective electro-optic light modulator is an active matrix liquid crystal display device.

5. The display system of claim 2 in which the matrix array is illuminated with scrolling color bars corresponding to the color component sub-frame signal information being addressed.

6. The display system of claim 1 in which the frame rate is 60 Hz, and the rows of the pixel array are addressed twice during each frame with the sub-frame signal information.

7. A method for addressing a display system for displaying continuously updated image information signals arranged in successive frames representing full color frames, the system employing a reflective electro-optic light modulator comprised of a row-and-column matrix array of pixels, for modulating light in accordance with the image information signals during successive frame periods, the method comprising addressing each row of the array at least twice during each frame period.

8. The method of claim 7 in which each frame comprises at least two component color sub-frames, and each row of the array is addressed at least twice during each frame period with the image information signals for at least one of the component color sub-frames.

9. The method of claim 7 in which each row of the array is addressed at least twice during each frame period with the image information for all of the component color sub-frames.

10. The method of claim 1 in which the reflective electro-optic light modulator is an active matrix liquid crystal display device.

11. The method of claim 7 in which the matrix array is illuminated with scrolling color bars corresponding to the color component sub-frame signal information being addressed.

12. The method of claim 7 in which the frame rate is 60 Hz, and the rows of the pixel array are addressed twice during each frame with the sub-frame signal information.

* * * * *